(12) United States Patent
Yamada

(10) Patent No.: US 6,866,780 B2
(45) Date of Patent: Mar. 15, 2005

(54) HEATED ULTRASONIC TREATING DEVICE AND TREATING METHOD FOR SUSPENDED MATTER-CONTAINING LIQUID

(75) Inventor: Atsushi Yamada, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 182 days.

(21) Appl. No.: 10/239,371

(22) PCT Filed: Mar. 21, 2001

(86) PCT No.: PCT/JP01/02206

§ 371 (c)(1),
(2), (4) Date: Sep. 20, 2002

(87) PCT Pub. No.: WO01/70407

PCT Pub. Date: Sep. 27, 2001

(65) Prior Publication Data

US 2003/0047519 A1 Mar. 13, 2003

(30) Foreign Application Priority Data

Mar. 22, 2000 (JP) .................................. 2000-081043

(51) Int. Cl.⁷ .............................. C02F 3/10; C02F 1/36
(52) U.S. Cl. .................. 210/617; 96/175; 210/748; 210/175; 210/181
(58) Field of Search ................. 95/30; 96/175; 210/748, 175, 151, 181, 617

(56) References Cited

U.S. PATENT DOCUMENTS 3,578,072 A * 5/1971 Kolm .......................... 165/84
5,858,107 A * 1/1999 Chao et al. .................... 134/1

FOREIGN PATENT DOCUMENTS

| JP | 6-61550 | 8/1994 | |
|---|---|---|---|
| JP | 7-155790 | 6/1995 | |
| JP | 11-128975 | 5/1999 | |
| JP | 11-253906 | 9/1999 | |
| JP | 2001300523 A * | 10/2001 | ............. C02F/1/36 |

* cited by examiner

*Primary Examiner*—Duane Smith
*Assistant Examiner*—Douglas Theisen
(74) *Attorney, Agent, or Firm*—Pillsbury Winthrop LLP

(57) ABSTRACT

A heated ultrasonic treating device (6) comprising a sump (13) through which suspended matter-containing liquid passes, a temperature-controllable heater (14) disposes in the sump (13), and a ultrasonic vibrator (15) disposed in the sump (13). The heated ultrasonic treating device (6) uses the ultrasonic vibrator (15) to apply ultrasonic waves while heating organic drain passing the sump (13) with the heater (14), thereby pulverizing suspended matters and reducing the amount of SS. In addition, a treating column, where pulverized suspended matter-containing liquid is aerobically treated by aerobic microorganisms, is prevented from efficiency lowering due to clogging.

12 Claims, 2 Drawing Sheets

HEATED ULTRASONIC TREATING DEVICE AND TREATING METHOD FOR SUSPENDED MATTER-CONTAINING LIQUID

This application is the National Phase of International Application PCT/JP01/02206 filed 21 Mar. 2001 which designated the U.S. and that International Application was not published under PCT Article 21(2) in English.

TECHNICAL FIELD

The present invention relates to an apparatus and method for heat sonication of a liquid containing suspended solids.

BACKGROUND ART

Research has conventionally been directed to development of methods for treating organic drain water using aerobic microorganisms. In one example of such research and development, kitchen garbage discharged from houses or the like is crushed using a disposer to be processed together with kitchen drain water as drain water containing kitchen garbage.

The inventor of the present invention previously proposed a kitchen garbage processing apparatus performing the following procedures. A disposer crushes kitchen garbage discharged from a kitchen. A mixture of the crushed kitchen garbage and kitchen drain water is temporarily collected in a flow-rate adjustment tank. The drain water supplied from the flow-rate adjustment tank is separated into a solid portion and a liquid portion. The solid portion is processed into compost using a compost-producing device (solids processor). After particles within the liquid portion are separated through precipitation in a precipitation tank, the remaining supernatant, or organic drain water, is subjected to aerobic biological treatment (hereinafter referred to simply as "aerobic treatment") in treatment columns filled with a carrier carrying microorganisms (referred to as "microorganism carrier"), and finally drained.

However, the organic drain water supplied to the above treatment column contains fine suspended solids of kitchen garbage, which cause frequent clogging of the microorganism carrier in the treatment column.

DISCLOSURE OF THE INVENTION

The object of the present invention is to reduce SS (suspended solids) in the organic drain water supplied to the treatment column, so as to prevent clogging of the treatment column.

Specifically, ultrasonic wave is applied to the organic drain water to be supplied to the treatment column, such that suspended solids in the organic drain water are micrified and the SS level of the organic drain water is decreased. A method of processing organic sewage water with ultrasonic wave for reducing SS is already known (Japanese Patent Laid-Open Publication No. Hei 11-128975). However, although SS may be reduced, simply applying ultrasonic wave to organic drain water does not sufficiently prevent clogging of the treatment column.

It is the object of the present invention to provide an apparatus and method for micrifying, using ultrasonic wave, SS (suspended solids) in various liquids containing suspended solids, such as drain water containing kitchen garbage, sludge water, and general suspensions.

According to the present invention, a liquid containing suspended solids is subjected to ultrasonic wave while being heated so as to micrify the suspended solids. In this way, suspended solids in organic drain water that cannot be sufficiently reduced by simple sonication can effectively be micrified.

As a result, the SS level of organic drain water supplied to treatment columns filled with a filler can be minimized, thereby preventing clogging of the treatment column. Accordingly, aerobic treatment of organic drain water can successfully be performed.

The heat sonication described above is preferably conducted in a pool section where the liquid containing suspended solids is temporarily accumulated. In this way, effective SS micrification can be performed using a simple device.

The organic drain water is preferably drain water obtained by separating solid materials, using a solid-liquid separator, from the drain water containing kitchen garbage crushed by a disposer. The heating temperature is preferably higher than 50° C.

BRIEF DESCRIPTION OF THE DRAWINGS

FIG. 1(*b*) is a diagram showing an apparatus for heat sonication of sludge according to the present invention.

FIG. 2(*b*) is a graph showing the relationship between SS and processing time in an experimental result.

FIG. 2(*c*) is a graph showing the relationship between SS and temperature in an experimental result.

BEST MODE FOR CARRYING OUT THE INVENTION

Figure 1A:
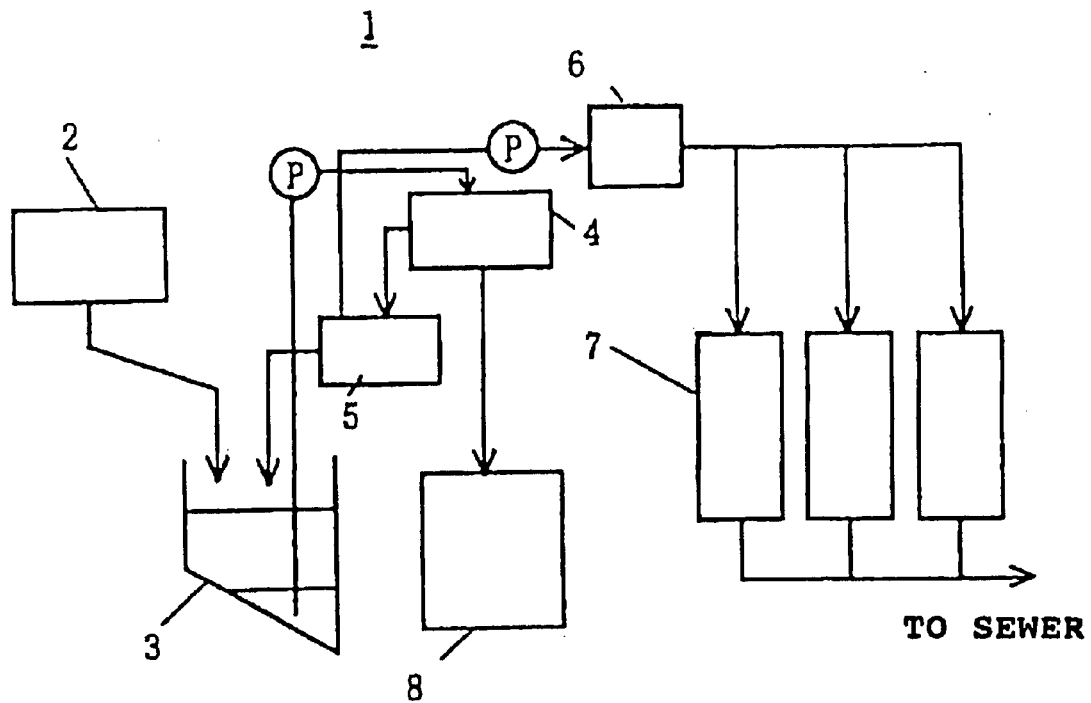
FIG. 1(*a*) is a diagram illustrating the general configuration of a kitchen garbage processor in which an apparatus and method for heat sonication of sludge according to the present invention are carried out.

An embodiment of an apparatus and method for heat sonication of a liquid containing suspended solids according to the present invention is next described based on an example by referring to the drawings.

FIG. 1(*a*) is a diagram illustrating the configuration of a kitchen garbage processor in which an apparatus and method for heat sonication of a liquid containing suspended solids according to the present invention are carried out.

The kitchen garbage processor 1 includes a disposer 2, a flow-rate adjustment tank 3, a solid-liquid separator 4, a precipitation tank 5, a heated ultrasonic treating device 6, a treatment column (drain water processor) 7, and a compost device (solids processor) 8. When this type of kitchen garbage processor 1 is practiced for a house, the disposer 2 is installed in an underneath portion of a kitchen sink. Further, the flow-rate adjustment tank 3, the solid-liquid separator 4, the precipitation tank 5, the heated ultrasonic treating device 6, the treatment column 7, and the compost device 8 are installed outdoors within a main body casing (not shown).

In this kitchen garbage processor 1, aerobic treatment is performed in the treatment column 7, allowing water to be drained into the sewer after undergoing adequate purification treatment to avoid negatively influencing the environment. Furthermore, the compost device 8 aerobically processes kitchen garbage to produce fertilizer.

In the kitchen garbage processor 1, kitchen garbage discarded from the sink of a kitchen counter is finely crushed to generate solid materials. The solid materials are mixed with kitchen drain water or the like to form solid-liquid mixture, which is supplied to the flow-rate adjustment tank 3. The solid-liquid mixture including solid sediments precipitated at the bottom of the flow-rate adjustment tank 3 is pumped by a pump P to be supplied to the solid-liquid separator 4. The flow rate of the solid-liquid mixture supplied to the solid-liquid separator 4 is determined by the capacity of the pump P.

Within the solid-liquid separator 4, the solid-liquid mixture is separated into solid materials and liquid (organic drain water). A screen that separates and eliminates solid materials larger than a predetermined size may favorably be used as the solid-liquid separator 4.

The organic drain water separated as the liquid portion in the solid-liquid separator 4 is supplied to the precipitation tank 5. In the tank 5, microparticles in the liquid are precipitated, and the remaining supernatant organic drain water is supplied to the heated ultrasonic treating device 6 by a pump P. At this point, the organic drain water contains a considerable amount of SS.

In the heated ultrasonic treating device 6, this organic drain water is next subjected to ultrasonic wave while being heated, as described later. After SS within the organic drain water are further micrified, the organic drain water is supplied to the treatment column 7. It is to be noted that SS are solid materials filterable by certain filter papers, and are reduced through processing by the heated ultrasonic treating device 6.

The treatment column 7 comprises a filler tank filled with a microorganism carrier such as sawdust, or wooden chip material. Microorganisms (mainly aerobic bacteria) carried and grown on the microorganism carrier performs purification treatment of the organic drain water. The purified organic drain water is discharged to the general sewer. It is to be noted that the inside of the filler tank is maintained in an aerobic state by allowing air inflow. Preferably, an aerobic state is ensured by forcing air into the tank using a blower or the like.

Meanwhile, the solid materials separated within the solid-liquid separator 4 are supplied to the compost device 8. In the compost device 8, aerobic processing is performed on the solid materials by microorganisms. It is preferable to maintain, also within the compost device 8, a microorganism carrier such as sawdust, or wooden chip material. The inside of the compost device 8 is periodically stirred to disperse the solid materials and to maintain an aerobic state within the tank. In this compost device 8, aerobic microorganisms reproduce, and compost (organic fertilizer) can be obtained. While carbohydrates are basically turned into water and carbon dioxide, the solid materials also include phosphorus, nitrogen, or the like deriving from bones and proteins, which make the obtained compost a good fertilizer including various nutritions.

Figure 1B:
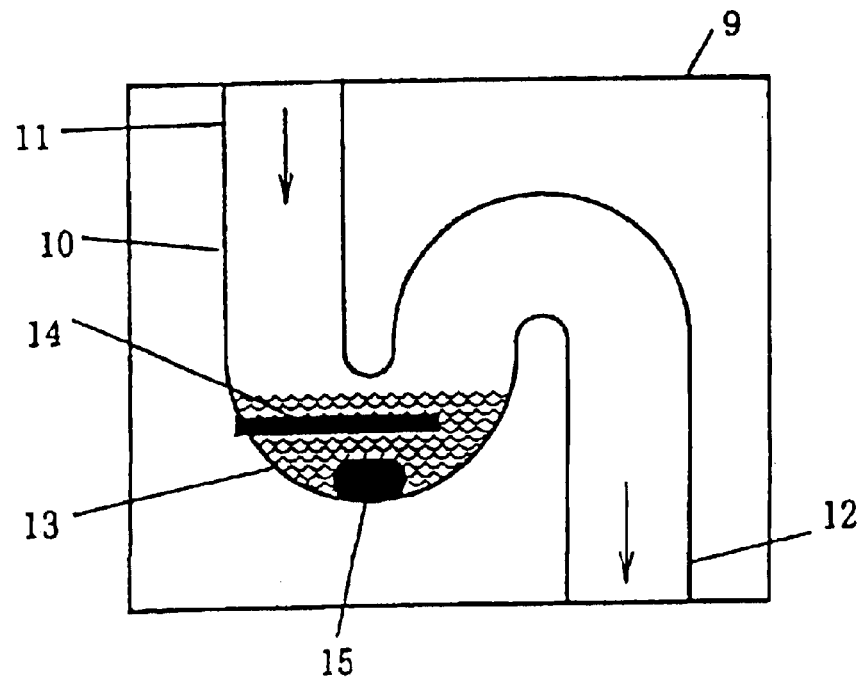

Next described are the structure of the heated ultrasonic treating device 6 and its function of micrifying suspended solids. FIG. 1(b) is a diagram showing an example structure of the heated ultrasonic treating device 6. The heated ultrasonic treating device 6 includes a tubular section. In the present example, the tubular section comprises a substantially S-shaped tubular trap 10 inside a frame 9. In other words, an inverted U shape is connected to the rear end of an upright U shape, together forming an S shape turned sideways. The incoming end (upper vertical portion) 11 of the tubular trap 10 is connected to the precipitation tank 5 via a pump P. The outgoing end (lower vertical portion) 12 is connected to the treatment column 7.

A pool section 13 is formed in the tubular trap 10. A stick-shaped heater 14 is installed protruding into the pool section 13. An ultrasonic oscillator 15 of an ultrasonic oscillating device is provided at the bottom of the pool section 13. The pool section 13 is a concavity in which the organic drain water passes through but temporarily accumulates. The heater 14 is provided to heat the organic drain water passing through this pool section 13, and is able to adjust temperature. While the tubular section of the heated ultrasonic treating device 6 according to the present invention is illustrated in this example as an S-shaped tubular trap 10, the present invention is not limited to such a structure. Other structures of the tubular section are possible, such as a straight tube and a curved tube, as long as the organic drain water can pass through and be applied with ultrasonic wave while being heated.

Furthermore, the heated ultrasonic treating device 6 need not be tubular as long as ultrasonic wave can be applied to the organic drain water while the water is being heated. In other words, the ultrasonic oscillator 15 and the heater 14 may be arranged within a tank which temporarily accumulates the organic drain water. In this case, the tank corresponds to the pool section 13.

Provided that the heater 14 can heat the organic drain water, the heater 14 need not be installed in the pool section 13, and may heat the tubular section. Moreover, the ultrasonic oscillator 15 may be installed inside or outside of the tubular section, as long as ultrasonic wave can be applied to the organic drain water.

The ultrasonic oscillator 15 is driven by an ultrasonic oscillation main device not shown, and applies ultrasonic wave to the heated organic drain water in the pool section 13. As a result, SS in the organic drain water are micrified and drastically reduced. The resulting organic drain water is supplied to the treatment column 7.

When the heated ultrasonic treating device 6 as described above is not provided, suspended solids in the organic drain water deposits on the microorganism carrier in the treatment column 7 to cause clogging. This degrades water permeability in the treatment column 7, obstructs contact of the organic drain water with the microorganism carrier, and hinders air permeability, thereby remarkably deteriorating the aerobic treatment performed by microorganisms. Specifically, SS in the organic drain water clog spaces between the microorganism carrier bits to generate ineffectual spaces, thereby degrading water permeability. As a result, the organic drain water cannot easily pass through the treatment column 7. Moreover, determined water paths may become created such that the organic drain water ends up passing through without sufficiently coming in contact with the microorganism carrier.

According to the present invention, the organic drain water treated in the treatment column 7 is subjected to ultrasonic wave while being heated in the heated ultrasonic treating device 6. Suspended solids in the organic drain water are thereby dispersed and micrified, decreasing the SS level. As a result, clogging of the treatment column 7 by suspended solids is much less likely to occur, allowing the organic drain water to readily contact the microorganism carrier. In addition, air permeability is maintained to improve efficiency of the aerobic treatment by microorganisms.

Figure 2A:
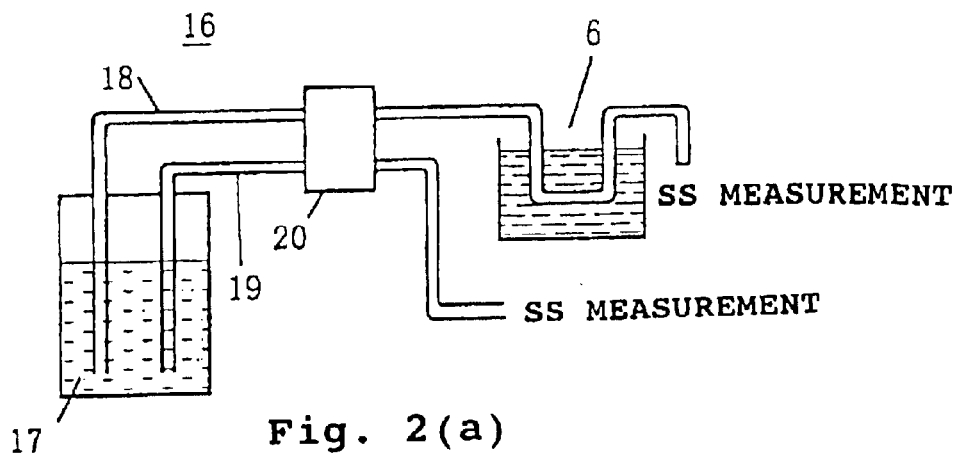
FIG. 2(*a*) is a diagram showing an experimental device for sludge sonication according to the present invention.

FIG. 2 is a diagram describing an experiment for verifying the effectiveness of the heated ultrasonic treating device 6. FIG. 2(a) shows an experimental device for performing the experiment. In this experimental device 16, supernatant 17 of a liquid containing crushed kitchen garbage (supernatant of organic drain water) is provided in a container as the raw supernatant for the column experiment. This supernatant 17 is pumped by a pump 20 through two tubes 18,19 to be supplied, through one tube, to a heated ultrasonic treating device 6 and, through the other, to be sampled as unprocessed control for comparison.

In the heated ultrasonic treating device 6, the above-referenced tube is passed through temperature-controlled water, such that the structure allows temperature of the supernatant to be adjusted and sonication to be performed. In the present experiment, an ultrasonic oscillator 15 of the heated ultrasonic treating device 6 is operated at 38 kHZ, 45W to micrify and reduce SS (suspended solids) in the supernatant. SS of the supernatant 17 is then measured. Meanwhile, temperature of the control is regulated to a constant temperature, for example. SS of the control is measured without performing sonication.

Figure 2B:
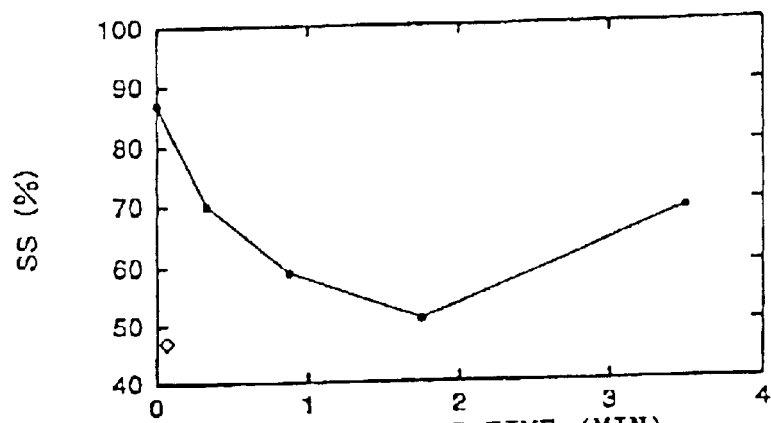

FIGS. 2(b) and (c) are graphs indicating results of the experiment using the above experimental device. The line graph of FIG. 2(b) shows the results for the case in which the supernatant is supplied to the heated ultrasonic treating device 6 and subjected to sonication while being heated to 55° C. The results were obtained by measuring SS of the supernatant discharged from the outlet of the tube 18 after different lengths of time (processing time) from the point of supplying the supernatant. The results are indicated as percentage with respect to SS of the control supernatant which was adjusted to a constant temperature and discharged from the outlet of the tube 19 without performing sonication (supernatant left at room temperature). According to this experiment, after processing for 3.5 minutes at 55° C., SS level was reduced by approximately 30% compared to the control supernatant.

The dot in the left corner of FIG. 2(b) indicates the measurement result for the supernatant preheated to 60° C. before micrification in the heated ultrasonic treating device 6. In this case, more than 50% of SS was reduced after 4 seconds of processing time (time passed after supplying the supernatant). Based on this fact, it is considered that the above-referenced time of 3.5 minutes is the time required for increasing the supernatant temperature, and that suspended solids instantly micrify by sonication when preheated.

Figure 2C:
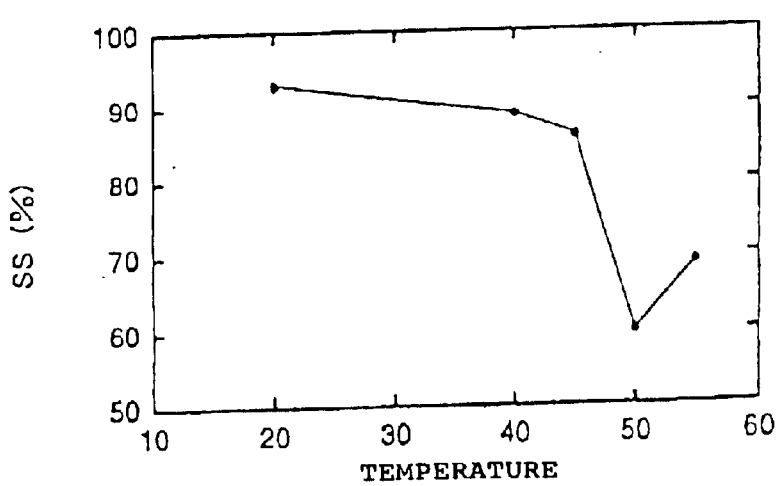

FIG. 2(c) shows changes in SS when the supernatant temperature is varied at a constant processing time of 3.5 minutes. The results are indicated as percentage with respect to SS of the supernatant left at a constant room temperature without performing sonication. This experiment shows that, at 50° C. or higher, SS level can significantly be reduced compared to the control.

As described above, SS level can be decreased by heating and micrifying the supernatant, although the reason is not clear. However, it is considered that, when the supernatant is heated, lipids included in SS undergo phase transition to become easily dispersed upon application of ultrasonic wave.

While an embodiment of the present invention has been described above based on an example by referring to the drawing, the present invention is not limited to such an example. Various embodiments are obviously possible within the scope of the technical features covered by the claims.

According to the above-described configuration of the present invention, suspended solids in organic drain water that cannot sufficiently be reduced by simple sonication can effectively be treated by sonication along with heating. As a result, SS level in the organic drain water to be supplied to the treatment column can be decreased, preventing clogging of the treatment column.

INDUSTRIAL APPLICABILITY

As the present invention realizes highly efficient micrification of suspended solids in liquids, the present invention can be used for treatment of drain water and sludge, and for micrification of other liquids containing suspended solids.

What is claimed is:

1. A heated ultrasonic treating device for micrifying a liquid containing suspended solids using ultrasonic waves, comprising:

a pool section formed using a bottom portion of a U-shaped member, through which said liquid containing suspended solids passes;

a temperature-adjustable heater installed in said pool section; and an ultrasonic oscillator installed in said pool section; wherein while said heater heats said liquid containing suspended solids passing through said pool section, said ultrasonic oscillator applies ultrasonic waves to said liquid containing suspended solids passing through, thereby micrifying suspended solids included in said liquid containing suspended solids.

2. A heated ultrasonic treating device for micrifying a liquid containing suspended solids using ultrasonic waves, comprising:

a pool section formed using a bottom portion of a S-shaped member, through which said liquid containing suspended solids passes;

a temperature-adjustable heater installed in said pool section; and an ultrasonic oscillator installed in said pool section; wherein while said heater heats said liquid containing suspended solids passing through said pool section, said ultrasonic oscillator applies ultrasonic waves to said liquid containing suspended solids passing through, thereby micrifying suspended solids included in said liquid containing suspended solids.

3. A heat sonication method for micrifying a liquid containing suspended solids using ultrasonic waves, wherein said liquid containing suspended solids is passed through a tubular section, and while a heater heats said liquid containing suspended solids inside said tubular section, an ultrasonic oscillator applies ultrasonic waves to said liquid containing suspended solids in said tubular section, thereby micrifying suspended solids included in said liquid containing suspended solids.

4. A heat sonication method for micrifying a liquid containing suspended solids using ultrasonic waves, wherein said liquid containing suspended solids is passed through a pool section, and while a heater heats said liquid containing suspended solids inside said pool section, an ultrasonic oscillator applies ultrasonic waves to said liquid containing suspended solids in said pool section, thereby micrifying suspended solids included in said liquid containing suspended solids.

5. A heat sonication method defined in claim 4, wherein said pool section includes a U-shaped portion, and a bottom part of said U-shaped portion is used as said pool section.

6. A heat sonication method defined in claim 4, wherein said pool section includes an S-shaped portion, and a bottom part of said S-shaped portion is used as said pool section.

7. A heat sonication method defined in claim 5, wherein organic drain water obtained through processing by said heated ultrasonic treating device is supplied to a treatment column filled with a microorganism carrier for performing aerobic biological treatment therein.

8. A heat sonication method defined in claim 5, wherein said liquid containing suspended solids is drain water obtained through separation, by a solid-liquid separator, of solid materials from drain water containing kitchen garbage crushed by a disposer.

9. A heat sonication method defined in claim 5, wherein said heater heats said liquid containing suspended solids to or above 50° C.

10. A heat sonication method defined in claim 6, wherein organic drain water obtained through processing by said heated ultrasonic treating device is supplied to a treatment column filled with a microorganism carrier for performing aerobic biological treatment therein.

11. A heat sonication method defined in claim 6, wherein said liquid containing suspended solids is drain water obtained through separation by a solid-liquid separator, of solid materials from drain water containing kitchen garbage crushed by a disposer.

12. A heat sonication method defined in claim 6, wherein said heater heats said liquid containing suspended solids to or above 50° C.

* * * * *